Figure 1:
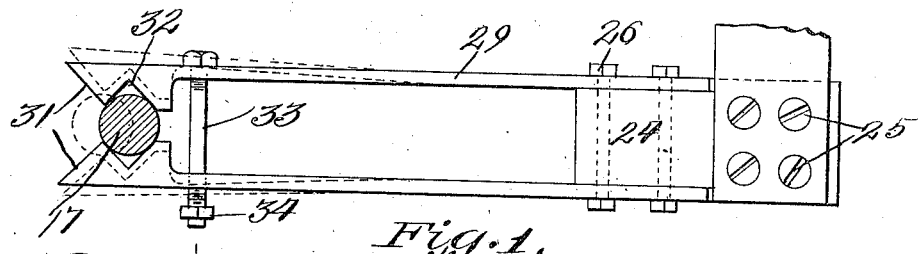

H. C. SCHEIDT, Jr. & W. A. REYNOLDS.
AUTOMATIC EMERGENCY TRAIN STOPPING MECHANISM.
APPLICATION FILED APR. 27, 1914.

1,181,617.

Patented May 2, 1916.

2 SHEETS—SHEET 1.

Witnesses

Inventors
Henry C. Scheidt Jr.
William A. Reynolds
By D. Swift &c.
Attorneys

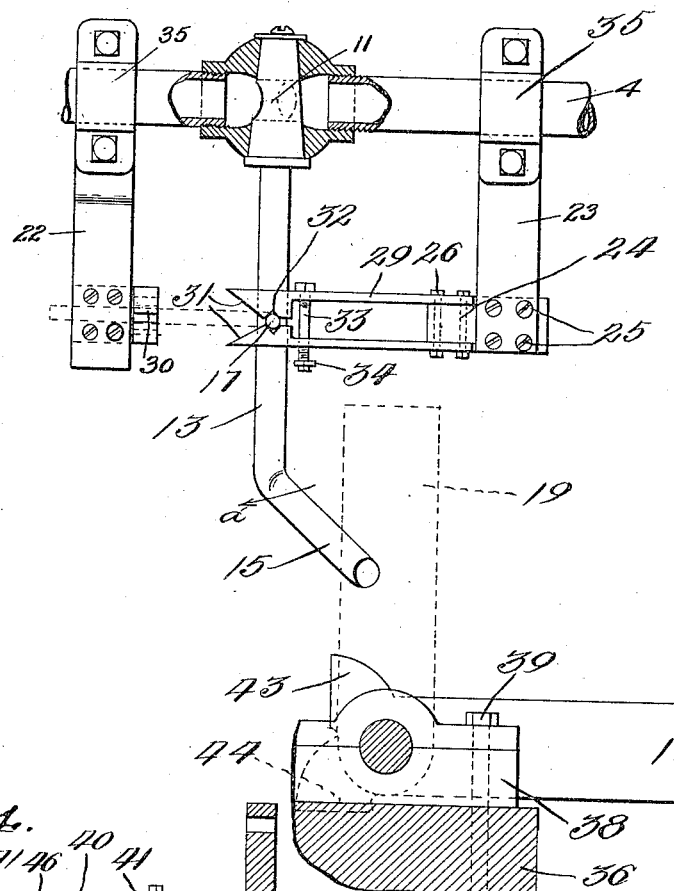

UNITED STATES PATENT OFFICE.

HENRY C. SCHEIDT, JR., AND WILLIAM A. REYNOLDS, OF PORT CHESTER, NEW YORK.

AUTOMATIC EMERGENCY TRAIN-STOPPING MECHANISM.

1,181,617.  Specification of Letters Patent.   Patented May 2, 1916.

Application filed April 27, 1914. Serial No. 834,747.

*To all whom it may concern:*

Be it known that we, HENRY C. SCHEIDT, Jr., and WILLIAM A. REYNOLDS, citizens of the United States, residing at Port Chester, in the county of Westchester and State of New York, have invented a new and useful Automatic Emergency Train-Stopping Mechanism; and we do hereby declare the following to be a full, clear, and exact description of the invention, such as will enable others skilled in the art to which it appertains to make and use the same.

This invention relates to an improved road side obstacle or device, such as a spring tensioned rocking shaft including an operating mechanism therefor, designed for use in connection with an emergency train stopping mechanism, which rocking shaft when actuated, throws an arm in the path of a member of a valve of the emergency train stopping mechanism, for actuating the valve, for cutting off the supply of steam, in order to stop the train.

In practical fields the details of construction may be subjected to alterations, falling within the scope of what is claimed.

The invention comprises further features and combination of parts, as hereinafter set forth, shown in the drawings and claimed.

Figure 2:
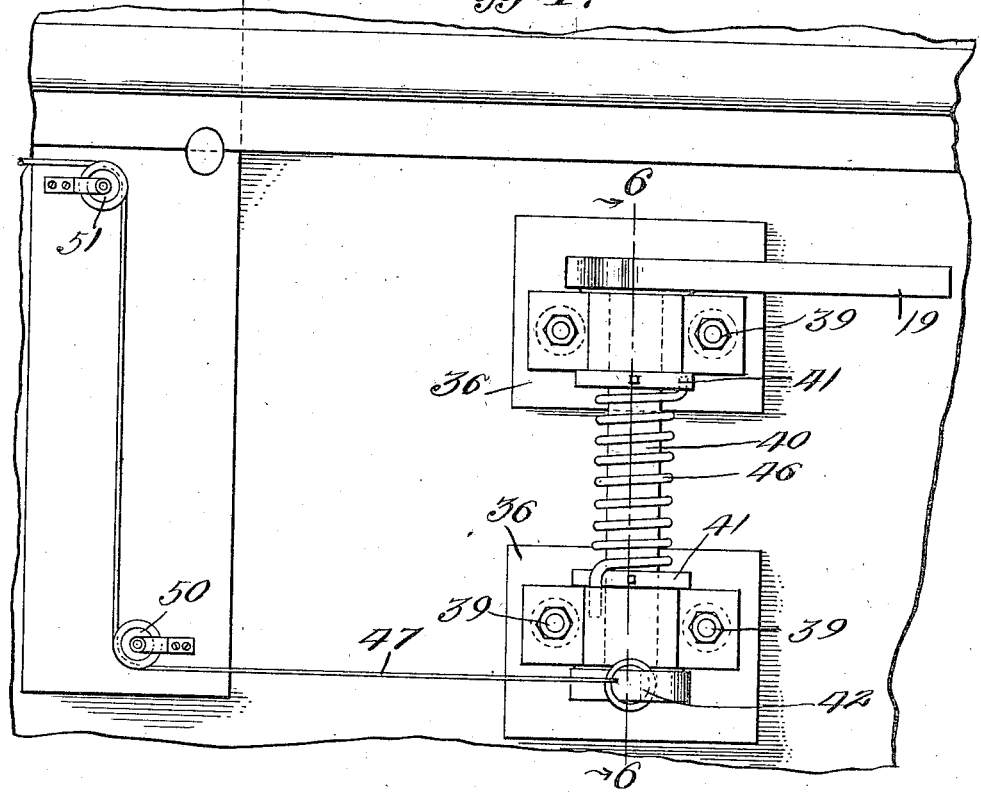

In the drawings: Figure 1 is an enlarged detail view of the holding means. Fig. 2 is an enlarged plan view of the trip device. Fig. 3 is a side elevation of the trip device, showing the trip device down in full lines and shown in operative position in dotted lines. Fig. 4 is a sectional view on line 6—6 of Fig. 2.

Referring more especially to the drawings 4 designates a steam supply pipe, designed to connect a suitable source of supply (not shown) and the steam chest (not shown), and which supply pipe is designed to carry the usual form of valve (not shown) for controlling the steam from the supply to the chest, which valve is designed to be operated manually by the engineer. However, this steam supply pipe 4 is provided with an additional valve 11 having a valve stem 13, which terminates in a laterally extending arm 15 adapted to contact with the trip device 19, when thrown in a vertical position, so as to cut off the supply of steam to the steam chest (not shown), in case the engineer or fireman on the engine (not shown), is unable for any reason whatsoever to operate the manually controlled valve (not shown). Depending from the steam pipe 4 are bracket arms 22 and 23, to which a plate 24 is bolted or otherwise secured at 25. Bolted at 26 to the plate 24 are spring arms 29 and 30, the adjacent free ends of which are provided with teeth 31, which spring arms 29 and 30 constitute jaws. The teeth at the extremities of said spring arms or jaws are so shaped as to permit the pin 17 of the valve stem 13 to enter between said jaws, and be grasped in the crotches 32 of the teeth, to hold the valve 11 either open or closed. A bolt 33 extends through each pair of spring arms or jaws adjacent said teeth, there being nuts 34 to permit the arms or jaws to open a limited distance, as well as limiting the pin 17 in its movement. The depending arms 22 and 23 are secured in place by the clamping plates 35. For instance, supposing the trip device 19 has been thrown to a vertical position, and an unavoidable accident has occurred to the engineer and fireman of a subsequent or following train. The laterally extending arm 15 of the valve 11 would come in contact with the trip device, and would close the valve. As the arm 15 is moved the pin 17 would be forced from between said jaws 29, and between and toward the jaws 30, thereby holding the valve in the position operated, or in other words, close the valve, thereby cutting off steam to the steam chest, thereby assisting in stopping the engine (not shown). A valve similar to the valve 11 and attendant devices and elements similar to those set forth may be used in connection with an air brake pipe, so that when such a valve is closed by a trip device, the brakes may be applied.

In mounting the trip device 19 in the present instance, there is provided a pair of cement blocks 36, in which the heads and portions of the shanks of the bolts 37 are embedded, said bolt being inverted. These bolts 37 pass through bearing blocks 38, there being nuts 39 to hold the bearing blocks in position. The trip device 19 is formed integral with a shaft 40, which is mounted in said bearing blocks, there being annular collars 41, to prevent endwise movement of said shaft. An arm 42 is also constructed integral with the shaft 40. The trip device or arm 19 is provided with an extension or enlargement 43, which is designed to contact with one of the cement blocks 36, as at 44, which junction acts as a seat for the trip, in other words, an abutment, to reinforce the trip device or arm 19 when in a vertical position, and when said arms 15 and 16 contact with the trip arm or device 19, so that said arm or trip device 19 will stand the force of the blow. One of the cement blocks or base members 36 is constructed with a cushion 45, to be contacted with by the enlargement 43 in order to relieve the force of the blow to some extent. Coiled about the shaft 40 is a coil spring 46, having one end connected to one of the bearing blocks, while the other end of the spring is connected to one of the collars 41, which may be adjusted annularly to regulate the tension of the spring 46. A cable or the like 47 is connected to the arm 42 and passes over two pulleys 50 and 51, and is connected at its other end in any suitable manner to any suitable or conventional form or construction of signaling apparatus (not shown). Said signal apparatus (not shown) may be operated by electric signaling system of the block type, that is, for instance, if a train is in a certain block, thereby operating the electric signaling system to notify a following train of the location of the preceding train, the signal apparatus in turn pulls upon the cable, and throws the trip device or arm 19 in operative position, or rather in the path of said arms 15 and 16 of said valve.

The invention having been set forth, what is claimed as new and useful is:—

In a device as set forth, a pair of base members having bearing blocks secured thereon, a rocking shaft mounted in said blocks, spaced collars on said shaft, bolts for detachably and adjustably holding said collars on the shaft, one end of said shaft having a laterally extending arm, said arm constituting a trip device designed to actuate a train controlling mechanism when thrown in its path, a coil spring on the shaft between the spaced collars and having one end connected to one of the bearing blocks, the other end of the spring being connected to one of the collars, which may be adjusted annularly to regulate the tension of the spring, said coil spring being placed under tension when the shaft is rocked, and when the shaft is released the spring acts to return the shaft and the trip device to their initial positions, one of the base members being provided with cushioning means, said trip device having an extension at the base of the trip device and extending at right angles thereto, and designed to contact with the cushioning means, to limit and cushion said trip device when thrown vertically.

In testimony whereof we have signed our names to this specification in the presence of two subscribing witnesses.

HENRY C. SCHEIDT, Jr.
WILLIAM A. REYNOLDS.

Witnesses:
HENRY SCHEIDT, Sr.,
MAUD E. MONTGOMERY.

Copies of this patent may be obtained for five cents each, by addressing the "Commissioner of Patents, Washington, D. C."